United States Patent [19]

Dezern

[11] Patent Number: 4,507,999
[45] Date of Patent: Apr. 2, 1985

[54] SAW RETAINING ARRANGEMENT

[76] Inventor: Morris L. Dezern, 10609 Harrison, Fairdale, Ky. 40218

[21] Appl. No.: 402,088

[22] Filed: Jul. 26, 1982

[51] Int. Cl.³ .......................... B26D 1/12; B23D 45/16
[52] U.S. Cl. ........................................ 83/665; 83/663; 83/666; 30/390
[58] Field of Search ................. 83/663, 664, 665, 666; 30/390, 391, 388; 51/168; 279/8; 144/222, 236, 237, 238, 239

[56] References Cited

U.S. PATENT DOCUMENTS 2,167,744 8/1939 Cosby et al. ........................... 83/666
2,543,486 2/1951 Briskin ............................. 30/390 X
3,353,306 11/1967 Seymour et al. ................. 83/665 X Primary Examiner—Paul A. Bell
Assistant Examiner—Taylor J. Ross
Attorney, Agent, or Firm—Edward M. Steutermann

[57] ABSTRACT

A circular saw retaining arrangement where a circular saw blade is retained on a driven arbor shaft including an arbor plate located a selected distance from the end of the arbor and where the shaft of the arbor between the arbor plate and the end of the arbor shaft is threaded to receive an arbor nut, an improved means of securing the saw blade to the arbor including a collar of selected peripheral configuration to receive wrench means wherein the collar has a central aperture to receive the arbor shaft wherein one surface of the collar is roughened and adapted to be urged against the saw blade with the arbor nut threaded on the arbor shaft and tightened against the side of the collar opposite the side bearing the roughened surface.

5 Claims, 2 Drawing Figures

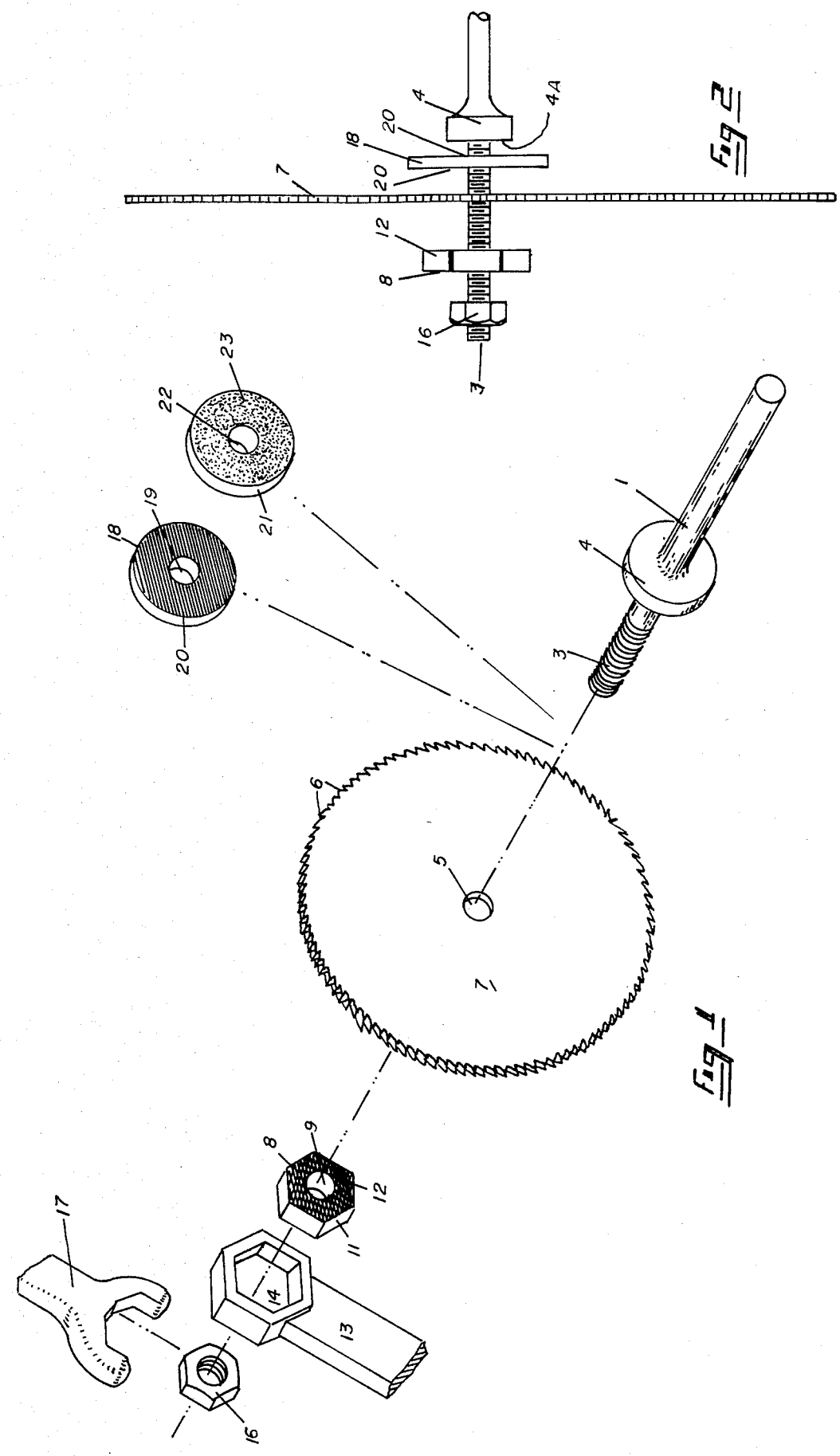

SAW RETAINING ARRANGEMENT

BACKGROUND OF THE INVENTION

The present invention relates to means for securing a saw blade to an arbor shaft, and more particularly provides means for securing the blade to the shaft and facilitating the removal of the saw blade from the arbor shaft.

In prior art arrangements, a saw blade is carried by an arbor shaft including an arbor backing plate where one side of the saw blade abuts the arbor plate and an arbor nut is threaded onto the arbor shaft to secure the saw blade by pressing against an opposite side of the saw blade to urge the saw blade against the arbor plate.

In prior art arrangements, removal of the arbor nut is difficult inasmuch as when a wrench is placed on the arbor nut and rotated, the arbor shaft and the saw blade are likewise rotated.

Various means have been utilized for securing the saw blade to permit independant rotation to the arbor nut on the arbor shaft to loosen the arbor nut so the saw blade can be removed. In one instance where the saw blade is carried on a table saw having a table through which the blade extends a block placed on the table to engage the saw teeth to prevent rotation of the saw blade and permit independant rotation of the arbor nut. Such an arrangement is, at best, awkward and dangerous and in some instances where a fine tooth saw blade is utilized it is difficult to securely engage the particular saw tooth so slippage occurs with the liklihood of damage to the person attempting to remove the saw blade.

In other instances a lock has been provided as part of the saw assembly to lock the arbor shaft or the blade when the blade is to be changed but such arrangements are expensive, and generally must be incorporated in the saw assembly upon manufacture.

No prior art arrangement permitting removal of the blade without locking the shaft is known.

The known art includes U.S. Pat. No. 3,705,611—Sakamoto which teaches an arrangement for including parallel spaced circular saw blades where retainer means are provided for the saw blade during changing but does not include any means to facilitate independant rotation of the arbor nut upon the arbor shaft.

The prior further includes U.S. Pat. No. 3,266,535—Brodie, which teaches an adjustable coupling between a blade and the driven spindle of a portable power saw for release of a blade whenever the blade encounters resistance to rotation. The Brodie reference, like the Sakamoto reference, and the prior art does not teach means for release of the arbor nut from the arbor shaft without locking the blade or arbor shaft.

SUMMARY OF THE INVENTION

The present invention provides an inexpensive, straightforward method and apparatus for release of an arbor nut from an arbor shaft for a circular saw assembly which is equally useful on table saws or portable saws.

Furthermore, arrangements within the scope of the present invention can be incorporated upon existing saw assemblies without the need for any modification of the drive assembly or the saw assembly itself.

Likewise the present invention provides an arrangement useful for changing blades of a table saw where it is not necessary to utilize a block or other means to prevent rotation of the saw blade during the period when the arbor nut is loosened.

Moreover the present invention provides an arrangement which is particularly useful on portable saws where securing the saw blade for removal is particularly difficult and where no satisfactory prior art arrangement is known to accomplish this objective.

More specifically, the present invention provides a circular saw retaining arrangement where a circular saw blade is retained on a driven arbor including an arbor plate located a selected distance from the shaft of the arbor and where the end of the arbor shaft between the arbor plate and the end of the arbor is threaded to receive an arbor nut including a collar of selected peripherial configuration to receive wrench means wherein the collar has a central aperture to receive the arbor shaft and wherein one surface of the collar is roughened and adapted to be placed against the saw blade with the arbor nut threaded on the arbor shaft and tightened against the side of the collar opposite the side bearing the roughened surface.

One arrangement within the scope of the present invention is illustrated in the Figures but it is to be understood that the example shown in the Figures is by way of example only and that other arrangements also within the scope of the present invention will occur to those skilled in the art upon reading the disclosure set forth hereinafter.

BRIEF DESCRIPTION OF THE DRAWINGS

In the drawings:

FIG. 1 is a perspective, exploded view of one arrangement within the scope of the present invention; and FIG. 2 is a plan view of an arrangement within the scope of the present invention.

DETAILED DESCRIPTION OF THE DRAWINGS

Referring now to FIG. 1, the arrangement shown includes an arbor shaft 1 which is driven by a motor (not shown), it being understood that the arbor shaft 1 can be carried directly by a motor as in a portable saw or can be driven by a belt and pully arrangement as in a table saw.

Arbor shaft 1 includes a backing plate 4 which, as known in the prior art is provided to support one side of a saw blade 7 when the blade is mounted. In the arrangement shown, which is a circular saw blade having teeth 6 as is known in the art with a control aperture 5.

In the arrangement shown, the arbor shaft 1 includes threads 3 located between the arbor plate 4 and the end of arbor shaft 1 where threads 3 are adapted to receive an arbor nut 16 to secure saw blade 7 in engagement with arbor plate 4.

In prior arrangements blade 7 is mounted to receive threaded section 3 of arbor 1 through aperture 5. Nut 16 is then tightened on threads 3 to secure blade 7 against plate 4.

In such an arrangement arbor 1, saw blade 7 and nut 16 turn as a unit so that nut 16 cannot be removed without locking arbor or saw blade 7.

In accordance with the present invention a second collar 11 is provided having a peripheral configuration of selected shape, in this case a hexagonal shape 8 adapted to be received by a wrench, for example a box end wrench 13 with a cooperative hex opening 14. The side 12 of collar 11 which abuts saw blade 7 as shown, is roughened, for example by knurling and collar 11 further includes an aperture 9 adapted to receive threaded portion 3 of arbor 1. It will be understood that within the scope of the present invention various other means can be provided to roughen the surface 12 of collar 11 abutting blade 7, for example by bonded particulate matter such as carborundum or other grit like substances. Advantageously aperture 9 is of greater diameter than threaded portion 3 of arbor 1 so that collar 11 does not bind arbor 1.

When assembled, as shown in FIG. 2, saw blade 7 is disposed to engage surface 4a of arbor plate 4 on one side. Collar 11 is placed on the threaded portion of arbor 1 so that the roughened surface 12 engages the side of the blade 7, opposite arbor plate 4. Arbor nut 16 is threaded onto thread portion 3 of arbor 1 into engagement with the side of collar 11 opposite the side 12. A wrench 13 is then place on collar 11 and a wrench 17 place on arbor nut 16. As arbor nut 16 is tightened it urges collar 11 to tighter engagement with blade 7 so that blade 7 is forced against arbor plate 4 whereby nut 16 can be rotated in threads 3 without rotation of arbor 1 if wrench 13 is supported in fixed position. As arbor nut 16 is tightened further, the roughened side 12 of collar 11 is curved into tighter engagement with the sides of the saw blade 7 and additional torque can be applied to arbor nut 16 to securely tighten the assembly.

Likewise to remove saw blade 7, wrench 13 is placed on collar 11 and wrench 17 is placed on arbor nut 16. With wrench 13 held firm to prevent rotation of blade 7 and arbor 1, wrench 17 can then be rotated to loosen arbor nut 16 without rotation of arbor 1 or blade 7.

FIGS. 1 and 2 further illustrate another arrangement within the scope of the present invention where a backing washer 18 or 21 can be provided to be inserted between blade 7 and arbor plate 4 by means of apertures 19 and 22 adapted to rewind threaded portion 3 of arbor 1.

Backing washer such as 18 or 21 can be utilized to further prevent relative rotation of saw blade 7 on arbor 1 and include roughened surfaces 20 and 23 respectively to engage the face of arbor plate 4.

It will be recognized that within the scope of the present invention both sides of collars 18 and 21 can be similarly roughened to prevent relative rotation between blade 1 and the collar.

It will be understood that only one of the collars 18 and 21 would be normally be utilized and that alternative methods of roughing are illustrated by each. In the case of collar 18 roughened surfaces 20 are provided to illustrate roughening by surface deformation, such as knurling, but it will be recognized that within the scope of the present invention other methods of surface deformation can be utilized.

In the case of collar 21 surfaces 23 are roughened by bonding of grit like substances as is known in the art.

It is to be understood that the foregoing example of arrangements within the scope of the represent invention are not by way of limitation and that various other arrangements within the scope of the present invention will occur to those skilled in the art upon reading the foregoing disclosure.

The invention claimed is:

1. A circular saw retaining arrangement including a circular saw blade with a central aperture, a driven arbor shaft including an arbor plate located a selected distance from the end of the arbor shaft where a first portion of arbor shaft between the arbor plate and the end of the arbor shaft is threaded to receive an arbor nut, collar means of selected periphery thereof and having generally planar first and second surfaces on opposite sides thereof with a central aperture therein to receive said first portion of said arbor shaft for location of the collar between the arbor nut and the saw blade and wherein said first planar surface of said collar means is adapted to be urged against the saw blade with the arbor nut threaded on the arbor shaft and the arbor nut tightened against said second surface of said collar opposite said first surface and wherein said first surface of the collar means is roughened to restrict relative movement between said first surface and said circular saw blade.

2. The invention of claim 1 wherein the first surface of the collar means is roughened by bonding grit like material thereto.

3. The invention of claim 1 including second planar collar means having a central aperture to receive said first portion of said arbor for location between said saw blade and said arbor plate and wherein opposite sides of said second collar are roughened and one of said opposite sides engages said saw blade and the other of said opposite sides engages said arbor plate.

4. The invention of claim 3 wherein said opposite sides of said second collar are roughened by surface deformation.

5. The invention of claim 3 wherein said opposite sides of said second collar are roughened by bonding grit like material thereto.

* * * * *